United States Patent
Rostampour

(10) Patent No.: US 8,230,204 B2
(45) Date of Patent: Jul. 24, 2012

(54) MIGRATION OF SYSTEM IMAGES

(75) Inventor: Arad Rostampour, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1879 days.

(21) Appl. No.: 11/159,649

(22) Filed: Jun. 23, 2005

(65) Prior Publication Data

US 2006/0294351 A1 Dec. 28, 2006

(51) Int. Cl.
*G06F 9/445* (2006.01)
*G06F 9/24* (2006.01)
*G06F 15/177* (2006.01)
*G06F 9/48* (2006.01)

(52) U.S. Cl. ............ 713/1; 713/2; 713/100; 713/300; 713/310; 713/320; 713/323; 713/324; 718/1; 718/100; 718/102; 718/104; 718/105

(58) Field of Classification Search .......... 713/320, 713/1, 2, 100, 300, 310, 323, 324; 718/1, 718/100, 102, 104, 105
See application file for complete search history.

(56) References Cited

U.S. PATENT DOCUMENTS

| | | | |
|---|---|---|---|
| 6,654,830 B1 | 11/2003 | Taylor et al. | |
| 6,802,062 B1* | 10/2004 | Oyamada et al. | 718/1 |
| 6,807,630 B2 | 10/2004 | Lay et al. | |
| 6,813,708 B2 | 11/2004 | Smith et al. | |
| 6,882,795 B1 | 4/2005 | McMurdie et al. | |
| 2004/0083355 A1 | 4/2004 | Smith et al. | |
| 2005/0060590 A1* | 3/2005 | Bradley et al. | 713/320 |
| 2005/0160423 A1* | 7/2005 | Bantz et al. | 718/1 |

OTHER PUBLICATIONS

Min Choi et al., "Cluster computing environment supporting single system Image", Sep. 20, 2004, Cluster Computing, 2004 IEEE International Conference, San Diego CA USA.

* cited by examiner

*Primary Examiner* — Fahmida Rahman

(57) ABSTRACT

Systems, devices, and methods, including program instructions, are provided for migrating operating system images. One method embodiment includes performing a process on a first device. The operation of the process is paused as a persistent image which is then migrated to a second device.

9 Claims, 4 Drawing Sheets

MIGRATION OF SYSTEM IMAGES

BACKGROUND

A computing device, such as a server, router, desktop computer, laptop, etc., includes an operating system layer and an application layer to enable the device to perform various functions or roles. The operating system layer includes a "kernel" (i.e., master control program) that runs the computing device. The kernel provides task management, device management, and data management, among others. The kernel sets the standards for application programs that run on the computing device and controls resources used by application programs. The application layer includes programs, i.e., executable instructions, which are located above the operating system layer and accessible by a user. As used herein, "user space", "user-mode", or "application space" implies a layer of code which is less privileged and more directly accessible by users than the layer of code which is in the operating system layer or "kernel" space. The operating system layer has software programs that include a set of Application Program Interfaces (APIs). The language and/or message format of the APIs allow an operating system to interpret executable instructions received from program applications (e.g., service applications) in the application layer and return results to the programs in the application layer.

When the execution of the program instructions call for data or other program instructions, the program will want to know where in memory the data or instructions are stored. In effect, the program will use a means for referencing or indexing where in memory the data or instructions are held. The kernel is responsible for memory management. A process is assigned its own memory address space, e.g., virtual memory address space, which may not be available to other processes. When a process uses a virtual memory address the virtual memory system translates it into a physical address using a virtual to physical address mapping contained in some type of look up structure and address mapping database. Addresses exist for both software components and hardware. Physical addresses are partitioned into input/output (I/O) space and memory space. The I/O space is associated with peripheral hardware devices.

More and more operating systems (OSs) are interfacing with advanced configuration and power interface (ACPI) systems. ACPI provides power management, configuration, and other extended capabilities. ACPI is an open industry interface specification that provides a way of communicating system information from firmware to the OS and a means of providing runtime firmware control methods, as well as a set of fixed hardware for the OS to access.

Many operating systems support hibernate semantics, i.e., sleep states, in which I/O is quiesced, system, processor, and memory state are saved to disk, and the system is shut down to save power. In programming parlance a "state" refers to the current or last-known status, or condition, of a process, transaction or setting. A persistent state preserves or maintains state information regardless of surrounding operations or environmental computing device conditions which are occurring, e.g., keeping track of the process despite power failures or loss of state in RAM or processors.

ACPI systems include a set of hibernation semantics. For example, in ACPI version 2.0, incorporated herein by reference, hibernate semantics are defined in association with an S1-S5 state, (S1-S4 are sleeping states, and S5 is a soft off state). Each of these states preserves some form of system context, i.e., the current status, condition, or mode of a system. Hence, each of these states preserves some form of state associated with the status or condition of a process, transaction, or setting. According to ACPI 2.0, S4 ("hibernation state") is the lowest-power, longest wake-latency sleeping state and can save and restore all system context. That is, upon power on, the S4 state is used to restore the system to its previous state, and resume the execution of programs where they left off before entering the sleep state.

To date, migration of a workload, e.g., operating system image, to other machines often involves shutting down the machine first and then migrating the workload when a system specific state associated with the program applications on the machine. Alternatively, machines can be clustered to commonly access system specific state information, e.g., to access shared data and operate as computer nodes. In some scenarios, stateless applications are provided such that alternate computer nodes, e.g., servers or other devices having processor logic and memory resources, can pick up where another computer node left off. In a bladed server environment workloads are often stateless and either have copies of static data, or access shared data. However, other applications, e.g., that are stateful, can not approach this problem in the same manner, and/or clustering the applications in a bladed environment may not make sense for one particular architectural reason or another. Hence, each of the above approaches to migrating a workload can involve significant downtime, added cost in creating a clustered environment, and/or time and resource expense to change existing software to be more stateless.

DETAILED DESCRIPTION

Embodiments described herein provide systems, devices, and methods, including program instructions, for migrating operating system images, i.e., the context and states of running programs, using hibernation semantics. In various embodiments, program instructions are provided which use an operating system's hibernation semantics to pause operation of a process, running on the first device. The program instructions can execute to migrate a persistent image of the process when the process is paused on the first device, without an OS shut down. Program instructions are further provided which execute such that a second device can continue the process, in association with the second device, from a point where the operation of the process was paused on the first device.

In various embodiments, the second device can include a virtual machine, a different memory partition, a device in a geographically dispersed configuration, a blade server located in a different system, etc.

While embodiments of the present invention are described in reference to ACPI systems, the embodiments are not limited to use with ACPI. Embodiments are intended to operate with and provide benefits with various operating systems, architectures, and/or configuration management systems.

Exemplary Computing System

Figure 1:
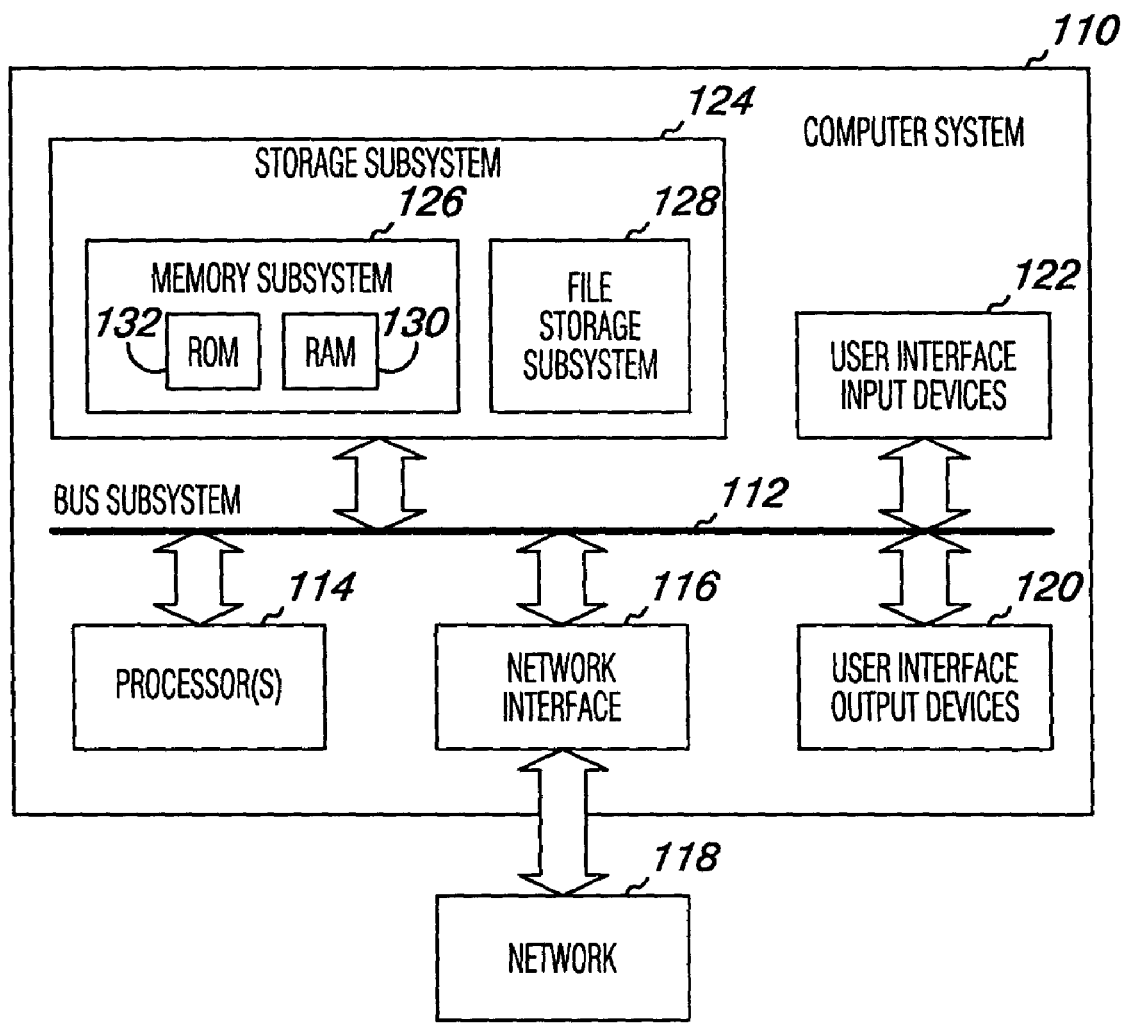
FIG. 1 is a block diagram of a computer system suitable to implement embodiments of the invention.

FIG. 1 is a block diagram of a computer system 110 suitable to implement embodiments of the invention. Computer system 110 includes at least one processor 114 which communicates with a number of other computing components via bus subsystem 112. These other computing components may include a storage subsystem 124 having a memory subsystem 126 and a file storage subsystem 128, user interface input devices 122, user interface output devices 120, and a network interface subsystem 116, to name a few. Embodiments of the invention can be implemented in a multi-processor or single processor system or computing device. Embodiments described herein can similarly be implemented in a distributed computing network environment. The embodiments are not limited to the examples given herein.

The input and output devices allow user interaction with computer system 110. Network interface subsystem 116 provides an interface to outside networks, including an interface to network 118 (e.g., a local area network (LAN), wide area network (WAN), Internet, and/or wireless network, among others), and is coupled via network 118 to corresponding interface devices in other computer systems. Network 118 may itself be comprised of many interconnected computer systems and communication links, etc. Communication links as used herein may be hardwire links, optical links, satellite or other wireless communications links, wave propagation links, or other mechanisms for communication of information.

Storage subsystem 124 can include the operating system "kernel" layer and an application layer to enable the device to perform various functions, tasks, or roles. File storage subsystem 128 can provide persistent (non-volatile) storage for additional program and data files, and may include a hard disk drive, a floppy disk drive along with associated removable media, a compact digital read only memory (CD-ROM) drive, an optical drive, or removable media cartridges. Memory subsystem 126 typically includes a number of memories including a main random access memory (RAM) 130 for storage of program instructions and data during program execution and a read only memory (ROM) 132 in which fixed instructions are stored. The operating system and a basic input/output system (BIOS) are stored in ROM 132.

As mentioned above, the kernel layer of a computer system manages the set of processes that are running on the system by ensuring that each process is provided with processor and memory resources at the appropriate time. A process refers to a running program, or application, having a state and which may have an input and output. A transaction refers to a computing operation (e.g., a routine and/or function) and a setting refers to a logical setting (e.g., a device setting and/or kernel parameter such as how many processes will be allowed per system user or how many processes will be allowed on the system at one time). The kernel provides a set of services that allow processes to interact with the kernel and to simplify the work of an application writer. As used herein an operating system of a computer system can include a Unix, Linux, AIX, Windows, and/or Mac operating system, etc. In various embodiments, an ACPI BIOS is also stored in ROM 132.

The memory subsystem 126 includes a memory management system, e.g., in RAM 130. The memory management system includes programs, code, data, look-up tables, etc. Thus, the memory management system within in memory subsystem 126 includes elements such as virtual memory data structures associated with various processes to support the management of memory in connection with program applications being executed by the processor(s) 114. Memory, including virtual memory, can be partitioned according to a memory management subsystem. The system memory 130 may also contain other programs and data, i.e., additional software.

The storage subsystem 124 provides various computer readable medium. As used herein, a computer readable medium is intended to include the types of memory described above. Program embodiments as will be described further herein can be included with the computer readable medium described above and may also be provided using a carrier wave over a communications network such as the Internet, wireless RF networks, etc. Bus subsystem 112 provides a mechanism for letting the various components and subsystems of computer system 110 communicate with each other as intended. Although bus subsystem 112 is shown schematically as a single bus, alternate embodiments of the bus subsystem 112 may utilize multiple busses.

Exemplary Configuration Management System

Figure 2:
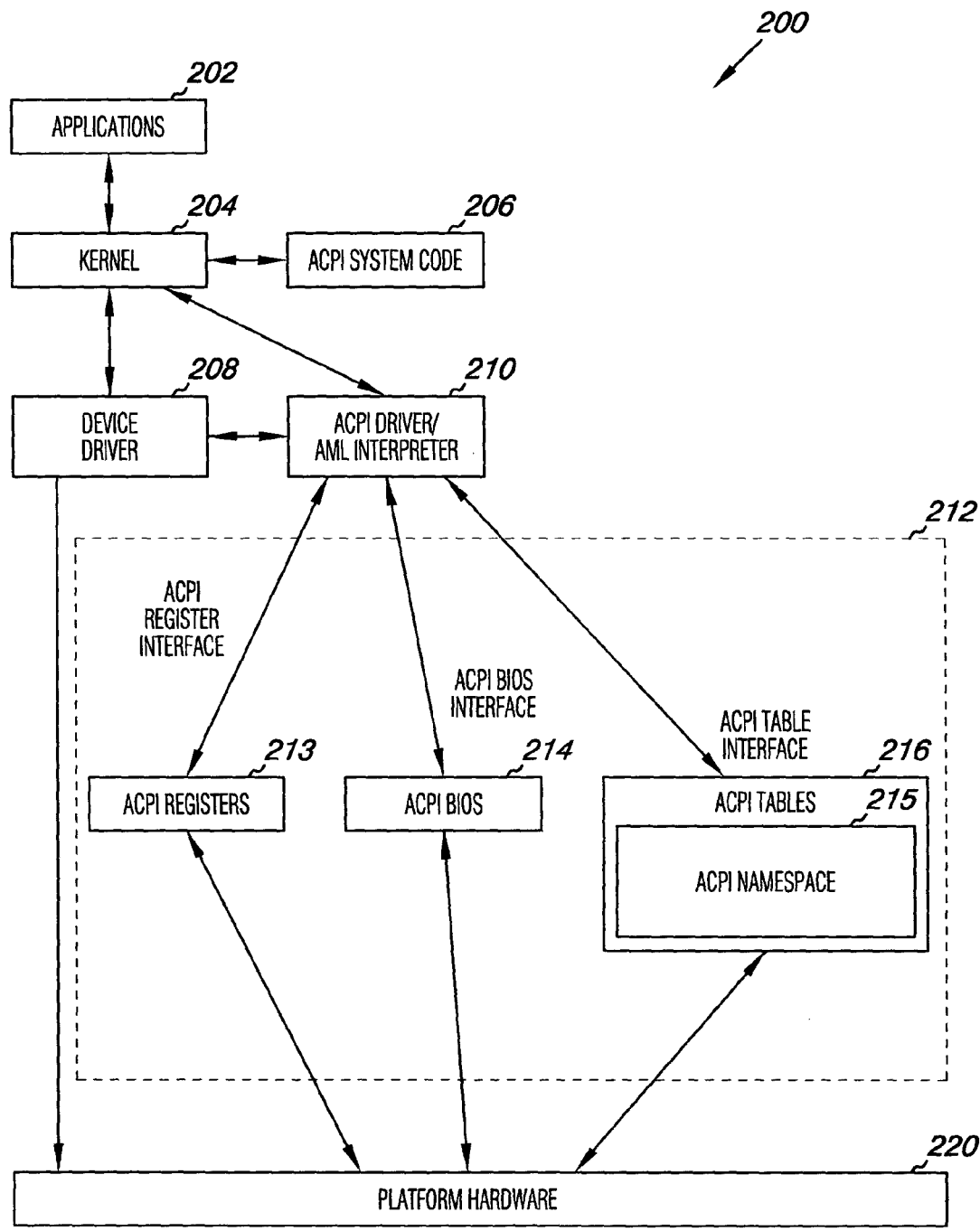
FIG. 2 is a block diagram of an ACPI system which is illustrative of configuration management systems.

FIG. 2 is a block diagram of an ACPI system 200 which is illustrative of configuration management systems. The ACPI system 200 can be implemented on a system or computing device 100 as shown in FIG. 1. In FIG. 2 application programs 202 in user space may interface with a kernel 204 in the operating system. As described above, running application program 202 may have many processes managed by the kernel 204 to ensure that each process is provided with processor and memory resources at the appropriate time. Stateful programs will have processes which will have a state, as the same has been described above, and which may have an input and output.

The kernel 204 can be generally considered as one or more software modules that are responsible for performing many operating system functions. One such function is passing information between the application programs 202 and the lower level components of the ACPI system 200, such as various device drivers (e.g., device driver 208), the ACPI driver 210 (described below), and the system hardware 220 (labeled as "platform hardware" in FIG. 2). As shown in FIG. 2, the kernel 204 interfaces with ACPI code 206 which includes one or more software modules that may be a part of an operating system and that may be used to modify the behavior of certain components of the computer system, e.g., 100 in FIG. 1. Various device drivers 208 interface with and generally control the system hardware 220, e.g., storage subsystem 124, and other peripheral components, e.g., input and output devices 122 and 120, installed on the computer system in FIG. 1.

The ACPI driver 210 is a software module that controls the functioning of much of the ACPI system 200. The ACPI driver 210 may be supplied as part of the operating system or as a separate component. The ACPI driver 210 provides an interface 212 between ACPI registers 213, an ACPI BIOS 214, an ACPI namespace 215, and the kernel 204 of the operating system.

ACPI control methods are written in an interpreted language, i.e., ACPI source language (ASL), which is compiled into ACPI machine language (AML) and stored or loaded into ACPI tables 216. AML is interpreted by an AML interpreter within the ACPI driver 210. The ACPI control methods interact with the system hardware in a manner which hides the hardware specific details from the operating system. An operation region is an ACPI data object where read or write operations to the object are performed in some hardware space. In other words, operation regions represent some memory space that contains hardware registers for use by ACPI control methods. Operation regions can facilitate firmware controlled interaction with particular virtual machines.

An operation region has identifying value(s) and a handler that performs accesses to various offsets in that operation region space. The above mentioned operation regions are assigned identifying values by the ACPI specification, e.g., publicly available ACPI specification version 2.0. The ACPI specification also allows vendors to define and handle their own operation regions by using identifying hexadecimal values between 0x80 and 0xff. Programming variables are structures that hold data and are uniquely named by the programmer. Variables are used to hold control and identifying values. A local variable includes values that are referenced only within the subprogram, function or procedure the variable is defined in. A global variable can be used by all modules and functions in the program.

Certain operating systems export an interface to the ACPI driver 210 that allows other drivers to register an operation region handler and to call control methods for its namespace. The operation region handler itself performs the accesses to the system memory space. The operation region handler is passed the offset, i.e., distance from the start of a memory address, into the operation region. Control methods can transfer operations of a computing device from a working state to a sleep state as described in more detail in connection with FIG. 3.

ACPI Example Sleep States

Figure 3:
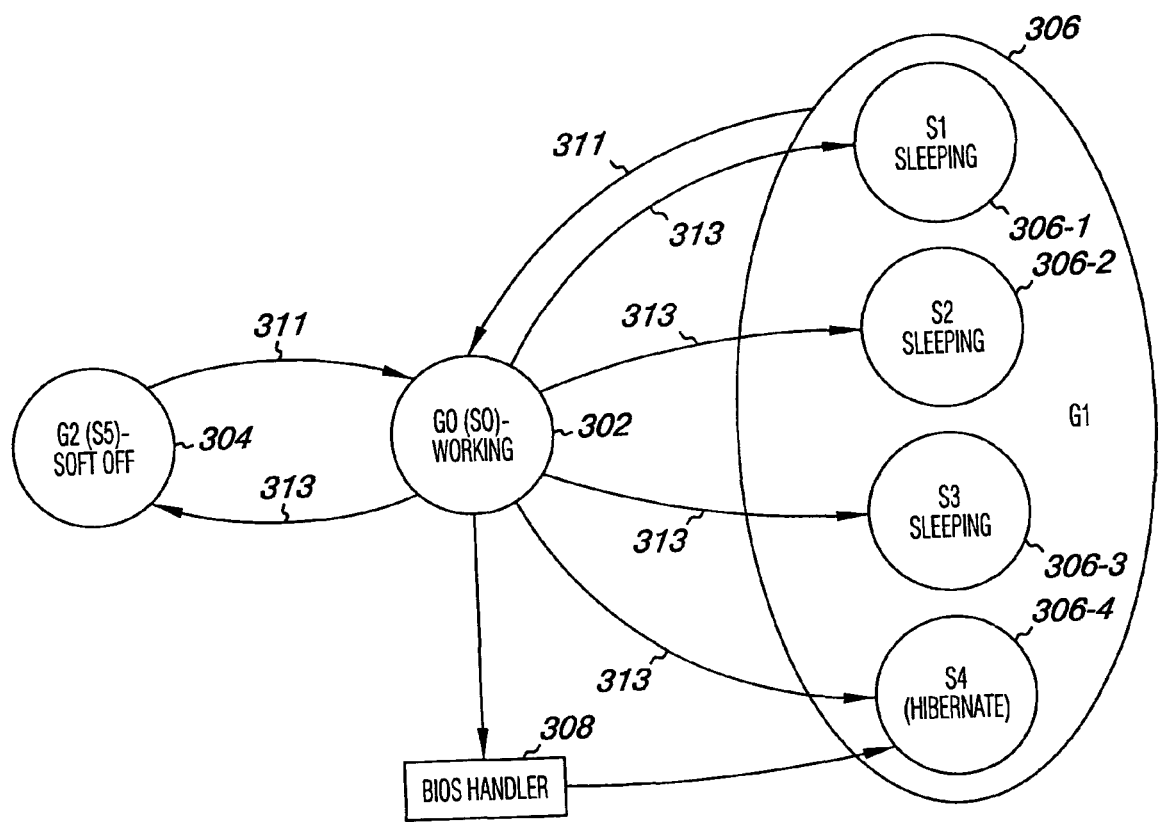
FIG. 3 is an example illustration which shows the transitions between a working state, sleeping states, and a soft off state associated with an ACPI system.

FIG. 3 is an example illustration which shows the transitions between a working state, sleeping states, and a soft off state associated with an ACPI system, e.g., as disclosed in the publicly available ACPI specification version 2.0. As shown in FIG. 3, ACPI version 2.0 defines three global states shown as G0 (S0) "working" 302, G2 (S5) "soft off" 304, and G1 (S1-S4) "sleeping" 306. In the G0 state work is being performed by the OS/application software and the hardware. In the G1 state the system is assumed to be doing no work. Prior to entering the G1 state the operating system power management will place device in a device power state compatible with the system sleeping state to be entered, e.g., S1-S4.

ACPI defines a mechanism to transition the system between the working state (G0) and a sleeping state (G1) or the soft off (G2) state. That is, ACPI defines a programming model that provides a mechanism for operating system power management to initiate the entry 313 to and exit 311 from a sleeping or soft off state (S1-S5). Each of these sleeping states is defined to allow implementations that tradeoff cost, power, and wake latencies. During transitions between the working and sleeping states, the context of the user's operating environment is maintained. ACPI also defines an alternate mechanism for entering and exiting the S4 state that passes control to the BIOS 308 to save and restore platform context. Reference to FIG. 3's transitions is made in connection with the method embodiments described in FIGS. 4 and 5.

Method Embodiments

Figure 4:
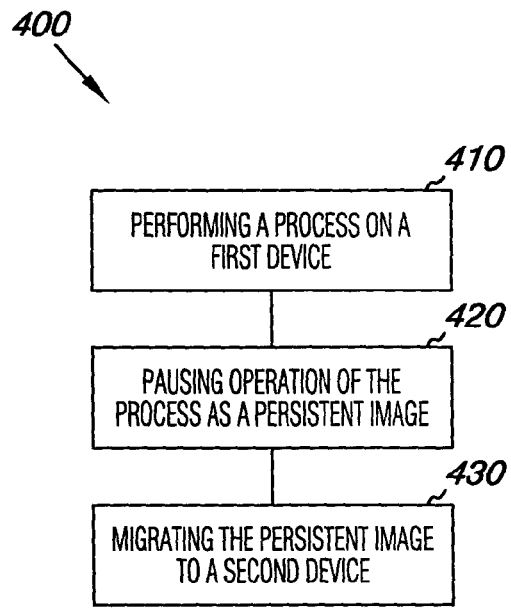
FIG. 4 is a block diagram illustrating a method for migrating operating system images according to various embodiments.
Figure 5:
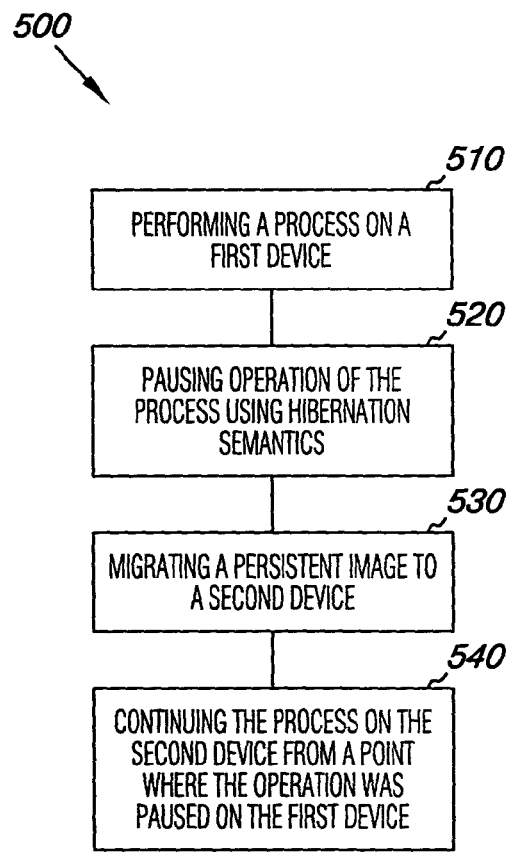
FIG. 5 is a block diagram illustrating another method for migrating operating system images according to various embodiments.

FIGS. 4 and 5 illustrate various method embodiments according to the present invention. Unless explicitly stated, the method embodiments described herein are not constrained to a particular order or sequence. Additionally, some of the described method embodiments or elements thereof can occur or be performed at the same point in time. The embodiments can be performed by software and/or firmware (i.e., computer executable instructions), hardware, application modules, and the like, executable and/or resident on the systems and devices shown herein or otherwise.

As shown in FIG. 4, one method embodiment 400 includes performing a process on a first device as shown at 410. The first device can include a computing device or system as described in detail in connection with FIG. 1. As illustrated by this method embodiment, a running, stateful program application, storable in memory and executable by a processor, may be performing a process on a particular computing device. The stateful application will thus include processes that have a state associated therewith, as the same have been described above, and may have an input and output.

At block 420 the method includes pausing operation of the process as a persistent image, i.e., including context and state information. According to embodiments, the process is paused using the hibernation semantics of the operating system with which the application is interacting to create the persistent image. As described above, ACPI defines a set of hibernation semantics that can be executed to pause a process running on a computing device. And, in various embodiments, the ACPI hibernation semantics are used to pause the process. By way of example and not by way of limitation, the hibernation semantics defined in the ACPI specification version 2.0 can be used to create the persistent image. Prior to entering a sleeping state (S1-S4) the operating system power management will execute particular AML/ASL code contained in the _PTS (prepare to sleep) control method. The ACPI programming model consists of a 3 bit field (SLP-_TYPx$^{16}$) that indicates the type of sleep state to enter, and includes a single control bit SLP_EN to start the sleeping process. Thus, the _PTS control method can indicate to an embedded controller what sleeping state the system will enter when the SLP_EN bit is set. The embedded controller can then respond by executing the proper power-plane sequencing upon this bit being set. Additionally, prior to entering a system sleeping state, e.g., S1-S4 (as well as the soft off state S5), the operating system power management will execute the _GTS (going to sleep) control method. _GTS allows ACPI system firmware to perform system specific functions prior to entering a system sleeping state.

Thus, in the above example, a user and/or the particular application running on a machine, i.e., computing device, can determine a workload is to be migrated, e.g., in the event of processor/memory failure or to move to a more powerful platform and/or virtual machines for resource management. Program instructions can execute to instruct the OS to enter a sleep state, e.g., the S4 hibernate state of an ACPI system.

At block 430 the method includes migrating the persistent image to a second device. According to embodiments, program instructions execute to migrate the persistent image while it is in a sleep state as the same has been described above. In the sleep state most of the system state is saved on disk. The program embodiments include instructions that can execute to transfer the persistent image, e.g., on disk contents to a new machine, i.e., to the second computing device. In some embodiments the program instructions execute to use an existing infrastructure to route the persistent image to the second device. That is, program instructions can execute to migrate the disk contents to a second device using a known sideband method or can execute to make the disk contents available within an infrastructure that allows the on-disk state to be accessible by multiple machines and routed to a new machine. For example, program instructions can execute to migrate the persistent image using an inter-process communication (IPC) layer as the same are known and understood. Embodiments, however, are not limited to these examples.

FIG. 5 illustrates another embodiment 500 for migrating operating system images. At block 510 the method again includes performing a process on a first device as the same has been described in connection with FIG. 4. At block 520 the method includes pausing operation of the process using hibernation semantics. According to various embodiments, the program instructions execute to transition the system into the S4 hibernate state of an ACPI system. The S4 hibernate state of the ACPI system can preserve all system/platform context to create a persistent image. Embodiments, however, are not limited to the above example of using ACPI hibernation semantics to pause a process executing on a device. Other operating system hibernation semantics can similarly be used.

As shown at block 530 the method includes migrating a persistent image, i.e., context and state information preserved using hibernation semantics, to a second device. Migrating the persistent image to the second device can be performed as described in connection with FIG. 4. Program instructions are executable to enable this function. That is, as described in connection with FIG. 4, the program instructions can execute to migrate the disk contents to a second device using a known sideband method or can execute to make the disk contents available within an infrastructure that allows the on disk state to be accessible by multiple machines and routed to a new machine. For example, program instructions can execute to migrate the persistent image using an inter-process communication (IPC) layer as the same are know and understood.

The execution of these programs instructions can be called when the first device is transitioned by the above described control methods to a sleep state and/or soft-off state, e.g., using the SLP_EN bit as described in connection with ACPI above. The program instructions can execute to move the disk contents to a new disk space and can execute to provide pointers to a new offset associated with this new disk space such that the second device does not have to be clustered with the first device, e.g., as in a bladed server environment. Migrating the persistent image in a sleep state and/or soft-off state avoids have to shut the first device down since such states do not involve shutting the first device entirely down. Migrating the persistent image, according to the techniques described in FIG. 4, includes transferring wakeup information to the second device. In various embodiments, the second device can include a virtual machine, a different memory partition within the same system, a device in a geographically dispersed configuration, a blade server located in a different system, etc. Embodiments are not limited to these examples.

At block 540 the method includes continuing the process on the second device from a point where the operation was paused on the first device. That is, program embodiments include instructions that execute to receive the persistent image and continue operation on the new machine from the state where the process was paused. As noted above, migrating the persistent image according to the program embodiments described herein includes transferring wakeup information to the second device. Thus, according to various embodiments, the program instructions can execute to employ the wakeup control methods defined by the ACPI system.

For example, upon waking, the operating system power management will execute the _BFS (back from sleep) control method. This allows the ACPI system firmware to perform various system particular functions prior to returning control to the operating system power management. The _WAK (wake) control method is then executed which contains AML/ASL code. The _WAK control method requests the operation power management system to check the platform for devices that might have been added or removed from the system while the system was asleep. The program instructions can then execute to continue operation of the process from the same state where the process had been paused. That is, the program instructions execute to recover to the original state and resume execution of the previous workload.

While the above has been described in connection with respect to an ACPI configuration management system, the embodiments are not limited to use with ACPI. Embodiments are intended to operate with and provide benefits with various operating system, architecture, and/or configuration management system in order to migrate operating system images using hibernate semantics.

Thus, according to embodiments described herein, program instructions are provided which can execute to; initiate a hibernate event, migrate a workload (e.g., system image including context and state information) to another node (e.g., virtual machine, different hard/soft partition in the same system, a machine in a geographically dispersed configuration, a blade server in a different geographical location, etc.), and the same stateful workload can be resumed on a new node. In various examples, e.g., processor/memory or other hardware failure, the old node can be completely shut down and can be serviced, replaced, tested, etc. The program embodiments described herein are applicable to sets of servers, partitions, virtual machines, geographically dispersed configurations, etc. Practicing the embodiments described herein can limit OS and/or application changes to migrate a workload to another system, even in the case of applications with OS particular states. In relation to virtual machines, the embodiments provide the ability to migrate in a manner which affords improved resource management. Additionally, embodiments can provide greater uptime moving system images, including running applications, off hardware that has errors. Hence, less cost and infrastructure may be involved than that associated with previous approaches which involved clustering, stateless applications, or shutting down machines.

Those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer readable medium having executable instructions stored thereon to cause a device to perform a method, comprising:
   performing a process on a first device;
   pausing operation of the process using hibernation semantics;
   migrating a persistent image to a second device; and
   continuing the process on the second device from a point where the operation was paused on the first device.

2. The medium of claim 1, wherein performing the process includes performing a process associated with a stateful application.

3. The medium of claim 2, wherein migrating the persistent image to the second device includes migrating to a second device which is not clustered to the first device.

4. The medium of claim 1, wherein migrating the persistent image to the second device includes migrating the persistent image to a different partition within a particular system.

5. The medium of claim 1, wherein the method includes migrating the persistent image to the second device in a different system.

6. A computing system, comprising:
   a first device, wherein the first device includes access to a processor;
   a memory coupled to the processor; and
   program instructions storable in the memory and executable by the processor to:
   pause operation of a process running on the first device using hibernation semantics; and
   migrate a persistent image of the process, including a state at which the operation was paused on the first device, without shutting down the first device; and
   a second device that includes access to program instructions executable to continue the process, in association with the second device, from a point where the operation was paused on the first device.

7. The system of claim 6, wherein the second device includes a virtual machine.

8. The system of claim 6, wherein the program instructions include instructions that execute to migrate the persistent image to a different memory partition.

9. The system of claim 6, wherein the second device includes a device in a geographically dispersed configuration.

\* \* \* \* \*